United States Patent
Stephan et al.

[11] Patent Number: 6,131,076
[45] Date of Patent: Oct. 10, 2000

[54] SELF TUNING SYSTEM FOR INDUSTRIAL SURVEILLANCE

[75] Inventors: Wegerich W Stephan, Glendale Hts., Ill.; Kristin K. Jarman, Richard, Wash.; Kenneth C. Gross, Bolingbrook, Ill.

[73] Assignee: ARCH Development Corporation, Chicago, Ill.

[21] Appl. No.: 08/900,545

[22] Filed: Jul. 25, 1997

[51] Int. Cl.[7] ................................................. G06F 19/00
[52] U.S. Cl. .......................... 702/189; 702/191; 700/29; 700/42
[58] Field of Search ............................ 702/89, 189, 190, 702/191; 364/149, 148; 340/164, 506, 651

[56] References Cited

U.S. PATENT DOCUMENTS

5,745,382   4/1998   Vilim et al. ............................ 702/127
5,764,509   6/1998   Gross et al. ............................ 364/149

*Primary Examiner*—Kamini Shah
*Attorney, Agent, or Firm*—Michael D. Rechtin; Foley & Lardner

[57] ABSTRACT

A method and system for automatically establishing operational parameters of a statistical surveillance system. The method and system performs a frequency domain transition on time dependent data, a first Fourier composite is formed, serial correlation is removed, a series of Gaussian whiteness tests are performed along with an autocorrelation test, Fourier coefficients are stored and a second Fourier composite is formed. Pseudorandom noise is added, a Monte Carlo simulation is performed to establish SPRT missed alarm probabilities and tested with a synthesized signal. A false alarm test is then emperically evaluated and if less than a desired target value, then SPRT probabilities are used for performing surveillance.

8 Claims, 13 Drawing Sheets

SELF TUNING SYSTEM FOR INDUSTRIAL SURVEILLANCE

CONTRACTUAL ORIGIN OF THE INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

The present invention is concerned generally with a system and method for carrying out an automated evaluation of sensor signals and to establish a filter function for removing serial correlation, if present, in the sensor signals. More particularly, the invention is directed to an automated methodology and system for evaluating statistical characteristics of signals from one or more sensors, designing an optimal filter for the particular type of noise characteristics and set sequential probability ratio test (SPRT) parameters so that the overall system meets prescribed false alarm and missed alarm probabilities.

A SPRT methodology has been developed (see, for example, U.S. Pat. Nos. 5,223,207; 5,459,675; and 5,410,492) for performing pattern recognition in industrial systems. The SPRT system validates signals and monitors sensor and equipment operability. Such a SPRT system can be trained to operate on signals coming from any type of sensor and with any sampling rate. Therefore, a properly trained SPRT system has defensible, quantitative false alarm and missed alarm probabilities. However, such SPRT systems require a technical specialist to customize and train the SPRT system for each new sensor configuration. Such an approach tends to be expensive and cumbersome to implement for each new application.

It is therefore an object of the invention to provide an improved method and system for pattern recognition.

It is another object of the invention to provide a novel method and system for automated tuning of a SPRT method and system.

It is also an object of the invention to provide an improved method and system for automated training of SPRT modules for a new surveillance or data monitoring application.

It is a further object of the invention to provide a novel method and system for automated adaptation and training of pattern recognition formalisms.

It is an additional object of the invention to provide an improved method and system for examining training data from a normal state with calibrated sensors, or otherwise normalized sources of data, and then employing a bootstrapping procedure to design an optimized pattern recognition methodology.

It is still a further object of the invention to provide a novel method and system for the automated design of an integrated SPRT/filter system for achieving an optimized SPRT system.

These and other objects and advantages of the invention will be readily apparent from the following description of the preferred embodiments thereof, taken in conjunction with the accompanying drawings described hereinafter.

BRIEF DESCRIPTION OF THE DRAWINGS

FIGS. 7A–I illustrate changes in Gaussian features and statistical whiteness after filtering using the twelve selected Fourier modes from a raw input signal with FIG. 7A showing a histogram of the raw signal.

DETAILED DESCRIPTION OF PREFERRED EMBODIMENTS

Figure 1:
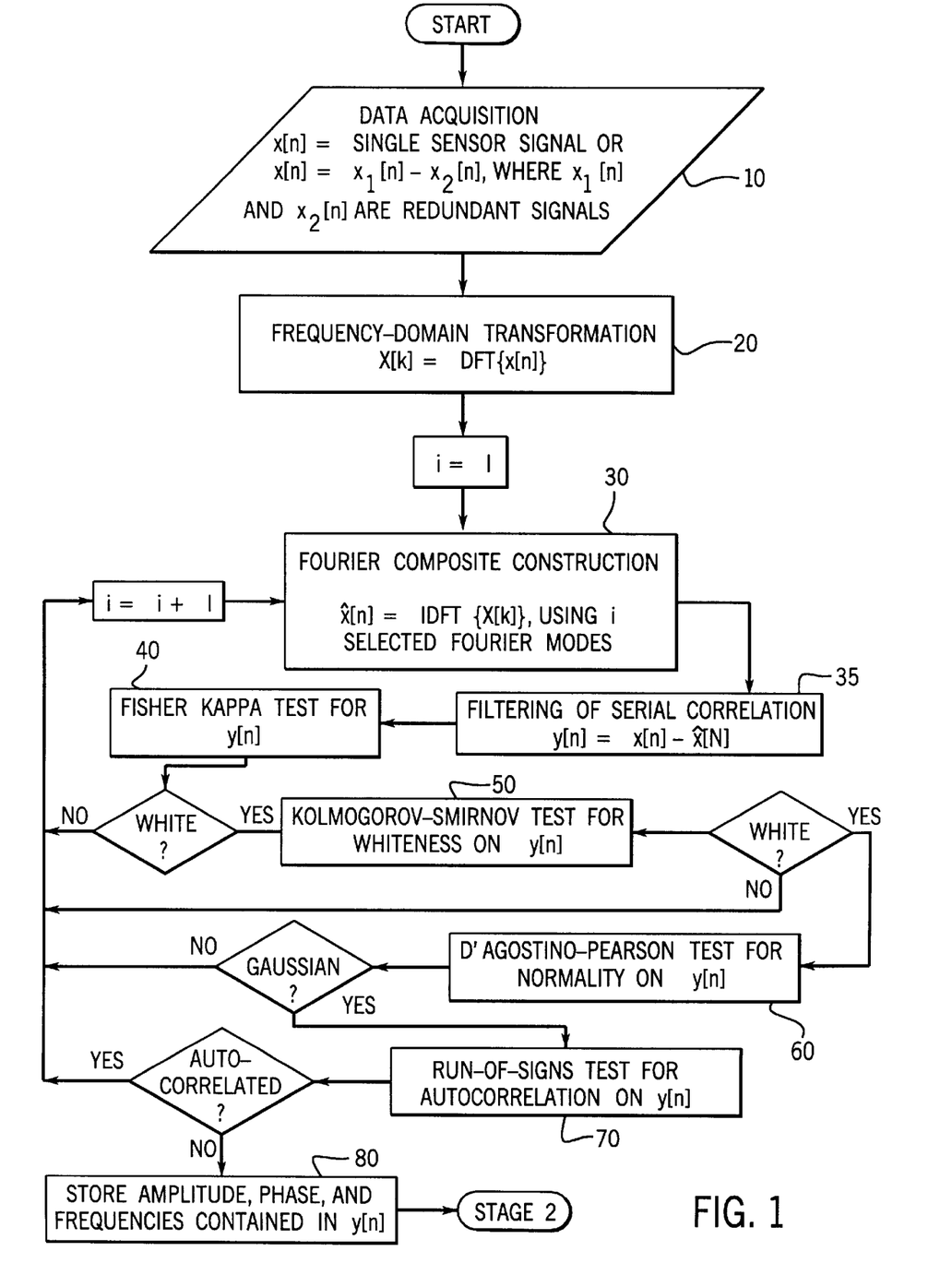
FIG. 1 illustrates a training stage of conversion of an incoming sensor signal or the difference between two redundant signals to a frequency domain signal and designing a spectral filter.
Figure 2:
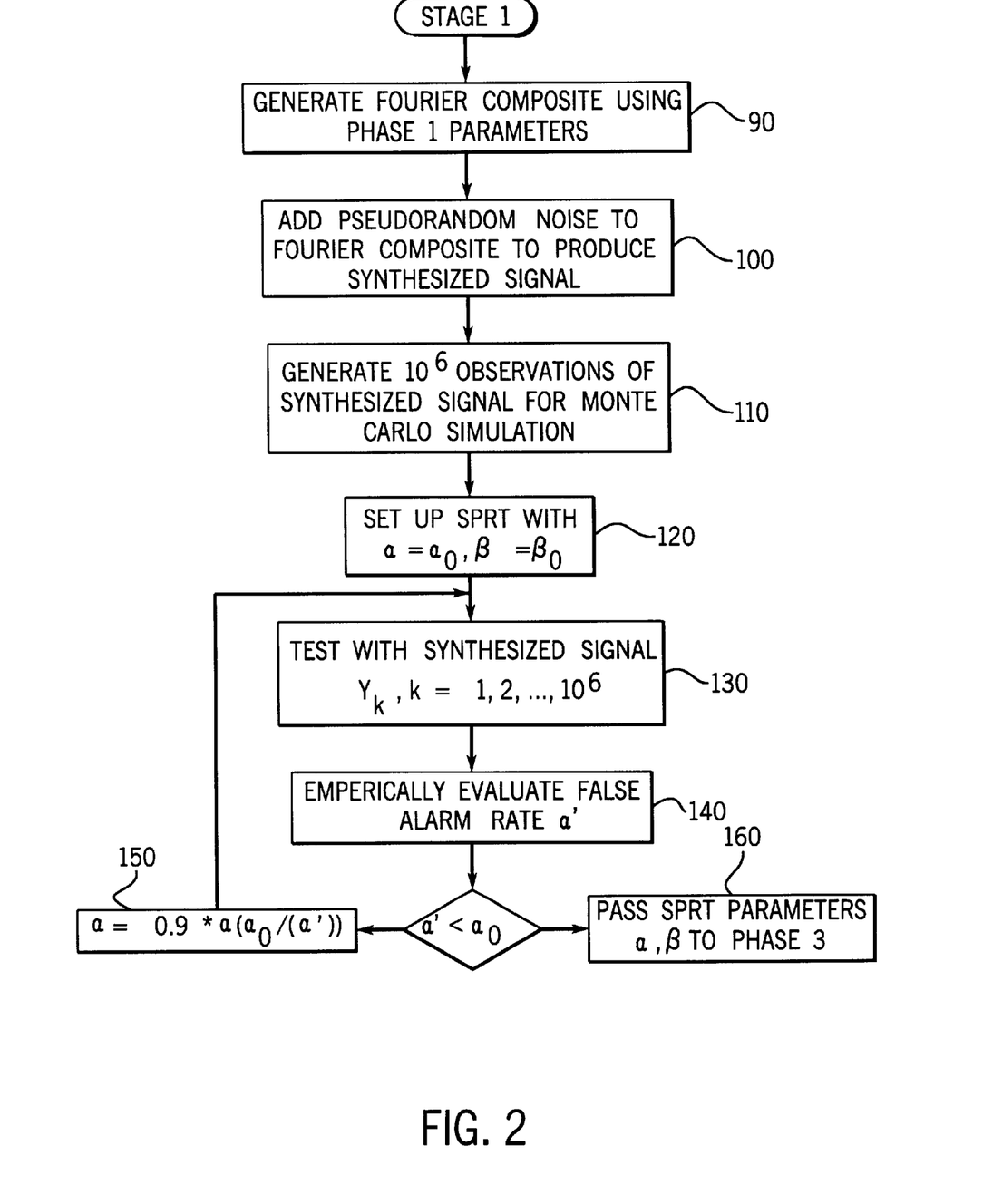
FIG. 2 illustrates adjustment of SPRT error probabilities using Monte Carlo simulation.
Figure 3:
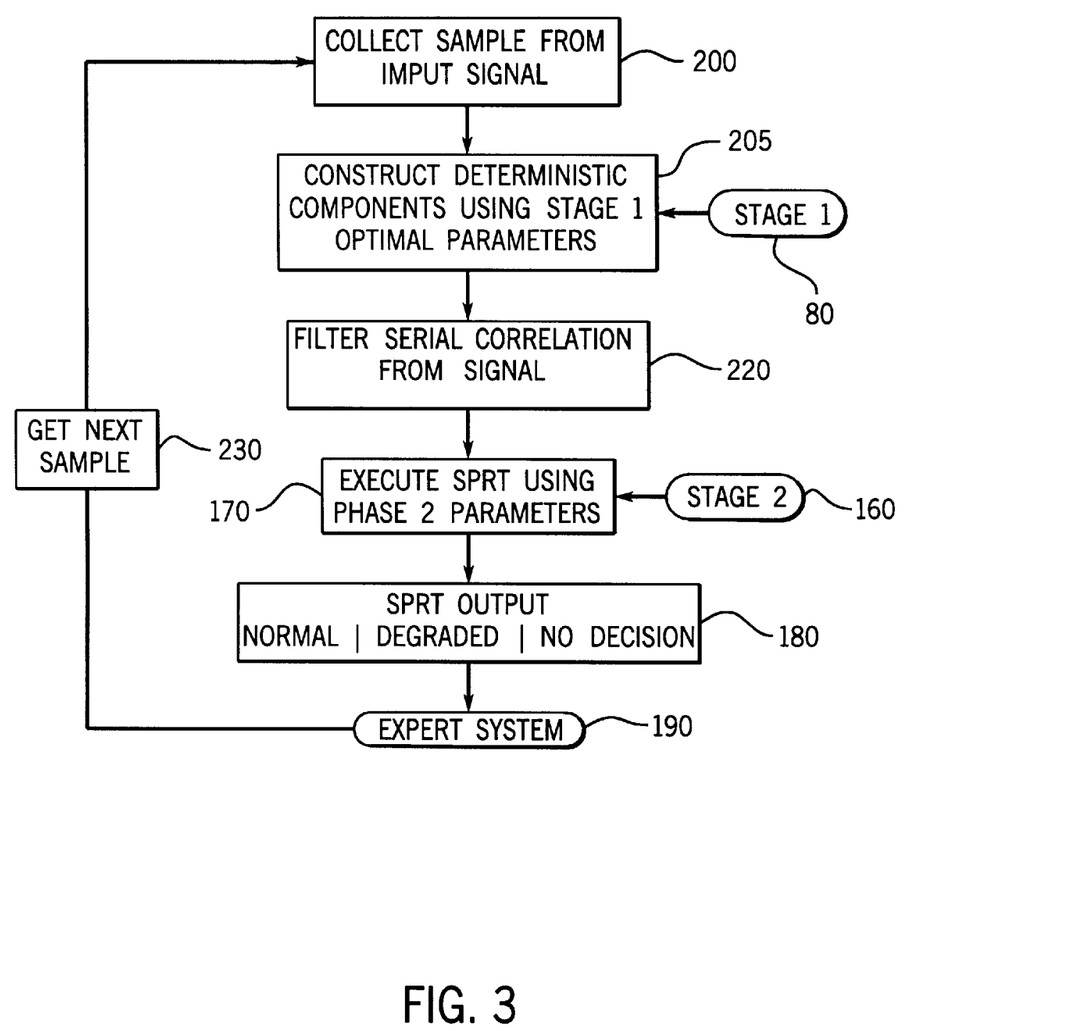
FIG. 3 illustrates real time filtering of serial correlation from signals.

A system and method constructed in accordance with the invention is described in FIGS. 1–3. In a first stage shown in FIG. 1, incoming collected data signals 10 are converted in a frequency domain transformation 20, such as by a Fast Fourier Transform (FFT). The Fourier composite is constructed from the i nodes selected in 30. The selection is made by identifying the i modes that are furthest away from the mean (or in some cases the median) of the Power Spectral Density (PSD) of the input signal $x[n]$. The Fourier composite is then used to filter serial correlation out of the input signal in steps 30 and 35, respectively. The filter step 35 is designed with an interactive bootstrapping procedure including four preferred statistical tests 40, 50, 60 and 70 applied during the bootstrapping procedure for quantitative assessment of the improvement in whiteness and normality during each pass. These statistical tests include test 40 (a Fisher-Kappa test for whiteness), a test 50 (a Kolmogorov-Smirnov test for whiteness), a test 60 (a D'Agostino-Pearson test for normality), and a test 70 (a Run-of-Signs test for autocorrelation).

The Fisher Kappa white noise test examines the periodogram of the signals by attempting to reveal periodicities in the data. The periodogram of a white noise process should contain no outstanding peaks or dips. Therefore, the Fisher Kappa test compares the largest power spectral density (PSD) value with the mean PSD value to determine if the time series under study can be considered a white noise process. To accept the null hypothesis that the data is white, the kappa statistic must be lower than its corresponding critical value.

The D'Agostino Pearson $K^2$ test for normality looks at the third and fourth moments, called the skewness and kurtosis respectively, of the signals. The skewness determines the degree to which the data lean asymmetrically to one side of the bell curve. The kurtosis reveals whether the bell is too narrow or wide to be considered a true Gaussian process. The sample skewness and kurtosis are calculated and compared to the estimated skewness and kurtosis of Gaussian data with the same mean and variance. For a Gaussian process, the skewness should be zero and the kurtosis should be three. The resulting $K^2$ test statistic is chi-square with two degrees of freedom. Values of $K^2$ exceeding the critical value call for a rejection of the null hypothesis that the data are Gaussian. Besides determining normality, this test also reveals characteristics of non-normality from the skewness and kurtosis.

The Kolmogorov-Smirnov test for normality is similar to the Fisher Kappa test for whiteness except the evaluation takes place here in the time domain as opposed to the spectral domain. The signals are compared to the corresponding value for a normal process, and the difference function evaluated. The test statistic must be lower than the critical value to accept the null hypothesis that the data are normal.

The run-of-signs test used on the signal is a conventional, nonparametric test which checks for autocorrelation. It is based on the hypothesis that positive autocorrelation results in long sequences, or runs, of data samples of the same sign. A run is a sequence of data samples, all of the same sign, with the two samples immediately surrounding the run having the opposite sign. The run-of-signs test determines the total number of runs in the filtered signal and compares that to the number of positive samples ($N_1$), the number of negative samples ($N_2$), and the total number of samples. An uncorrelated filtered signal will have the value $N_1$ close to $N_2$, and the number of runs will be approximately $(2N_1N_2/N_1+N_2)+1$.

In a next step 80 in FIG. 1, Fourier coefficients (amplitude, phase and frequencies) are stored to produce a composite signal which retains the essential deterministic features of the original signal. Adding a random component $e_t$ to the Fourier reconstruction $Y_t$ completes the reconstruction of the signals. Ideally, we prefer the original signal $X_t$ and the reconstructed signal $X'_t$ to have the same mean and variance, or identical first and second moments. To accomplish this, the variance of $X_t, Y_t$, and the residual function $e_t$ are compared. Since $Y_t$ is a deterministic function comprised of sines and cosines, and $e_t$ is a randomly generated function, the two are independent. This assures additivity of the variances $Var(Y_t)+Var(e_t)=Var(Y_t+e_t)$. Therefore, generating a Gaussian random function $e_t$ with $Var(e_t)=Var(X_t)-Var(Y_t)$ and mean 0, then adding it to $Y_t$ creates a signal $X'_t$ which agrees with the original signal through the first and second moments.

In the adjustment of SPRT error probabilities using Monte Carlo simulation shown in FIG. 2, the steps commence with constructing a synthesized signal with the same stochastic structure as the original signal by generating a Fourier composite 90 using the stored Fourier coefficients from step 80. In a next step 100 pseudorandom noise is added to the Fourier composite of step 90 which are scaled to produce a synthesized signal which has the same mean and variance as the original signal. This synthesized signal is then used in a step 110 to generate a statistically large number (such as $10^6$) of observations which are used to assess the empirical false alarm and set up missed alarm probabilities alpha and beta in step 120. In a next step 130 a synthesized signal is used to carry out a like number of observations (e.g., $10^6$) to determine in step 140 an empirical false alarm rate. If the empirical probabilities are less than the desired target values, the SPRT tuning is complete. However, if these empirical probabilities are greater than the target values, this is an indication that the bootstrapping procedure of FIG. 1 was unable to totally filter all of the serial correlation or non-normality found in the original signal under surveillance. In such a situation the probabilities are reduced in a step 150 using the indicated step and repeating the steps 130 and 140 until completing the tuning. Once the SPRT tuning is complete, in step 160 the final SPRT parameters are stored for use in real time surveillance in the methods of FIG. 3.

In the methods of FIG. 3, a signal from the monitored system is acquired in step 200, as defined in 10 of FIG. 1, and deterministic components constructed in step 205. This signal is filtered in step 220 so it will not include any significant serial correlation or departure from normality and will be passed to a SPRT module 170. The filtering in step 220 is effected using the deterministic components from step 205 using Stage 1 optimal parameters (step 80). The SPRT module 170 has been tuned with the parameters identified in the method of FIG. 2 to conform to prespecified false alarm and missed alarm probabilities. SPRT output 180 from the SPRT module 170 is in the form of normal, degraded or no decision status. In this last case there is insufficient information to make a decision between degraded and normal status, and thus additional sampling must be undertaken. These status indicators are then passed to a real time surveillance expert system 190 for comparison with output from other, parallel deployed SPRT modules followed by continued surveillance (e.g., step 230) or actuation of control functions as appropriate.

As further shown in FIG. 3 the expert system 190 continually receives samples 200 from the input signal. The terminus of FIGS. 1 and 2 are used to construct deterministic components 210 using the optimized Fourier coefficient from the step 80, followed by the step 220 of filtering serial correlation from the signal, inputting the filtered signal to the SPRT module 170 and generating the SPRT output 180 as explained hereinbefore.

The following non-limiting example illustrates an exemplary application of the methods of the invention.

EXAMPLE

Figure 4:
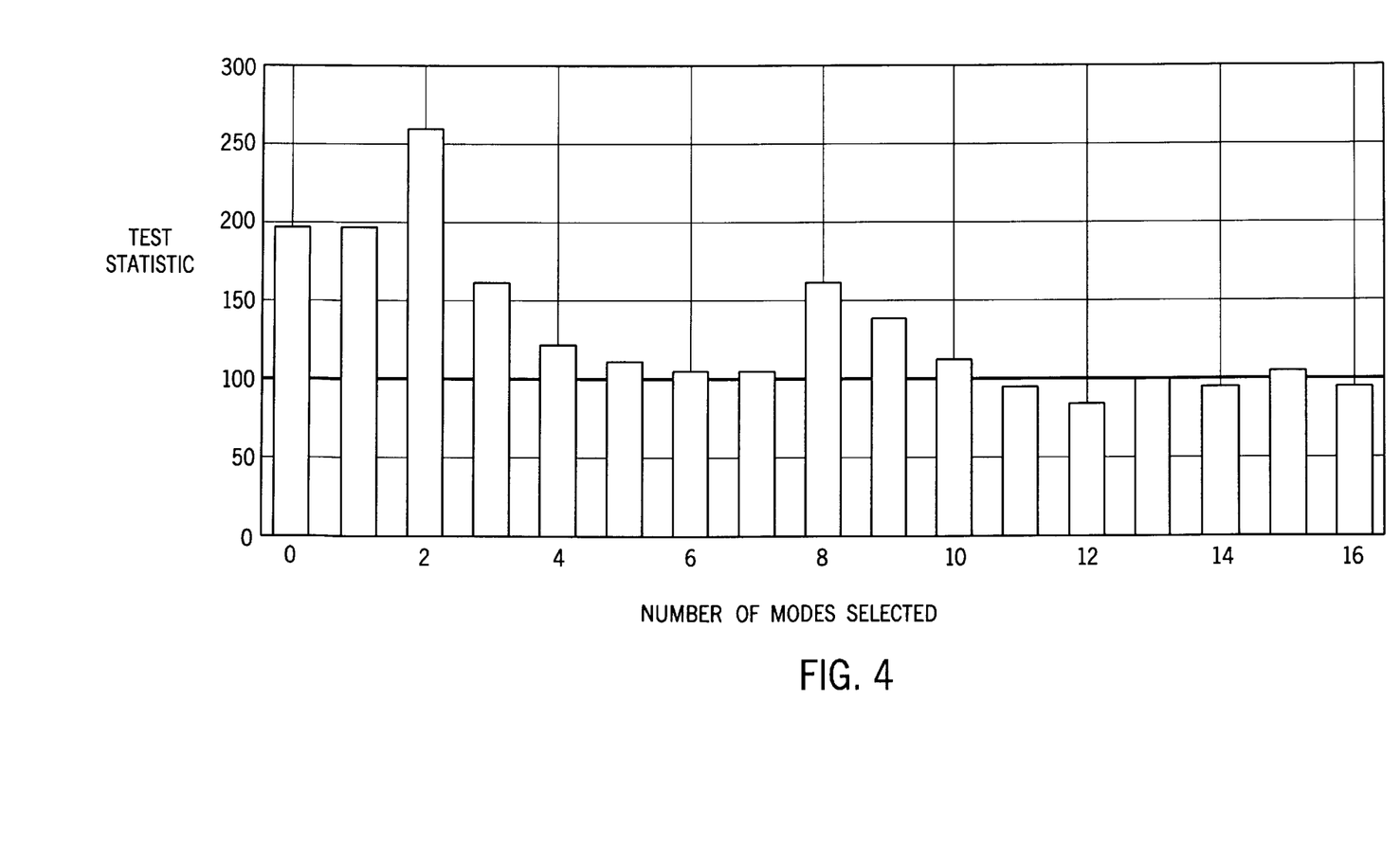
FIG. 4 illustrates a bar graph showing a test statistic used in determining when a residual signal is not Gaussian and statistically white.
Figure 5:
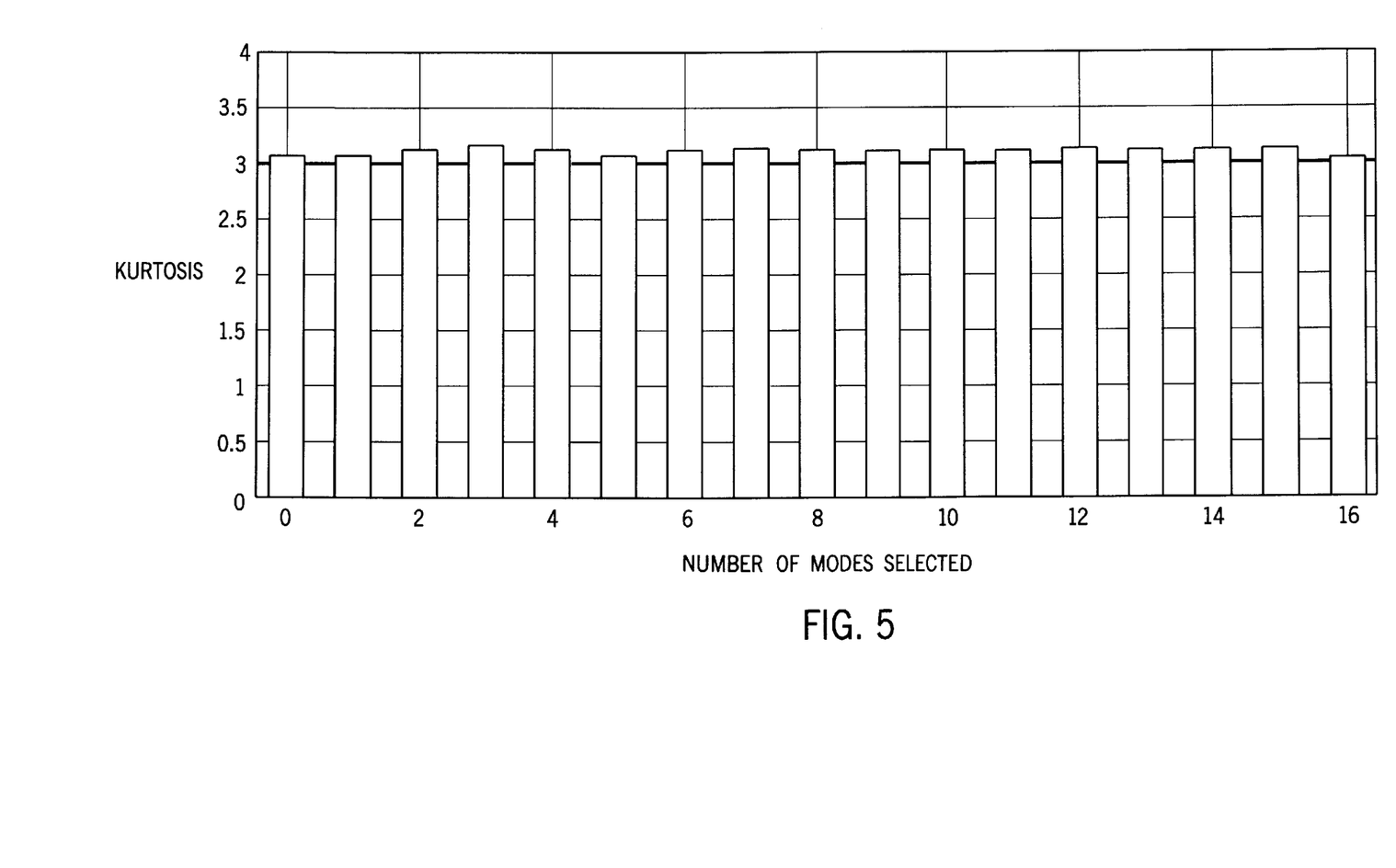
FIG. 5 illustrates kurtosis for each residual signal after the number of selected modes on the abscissa have been used for filtering.
Figure 6:
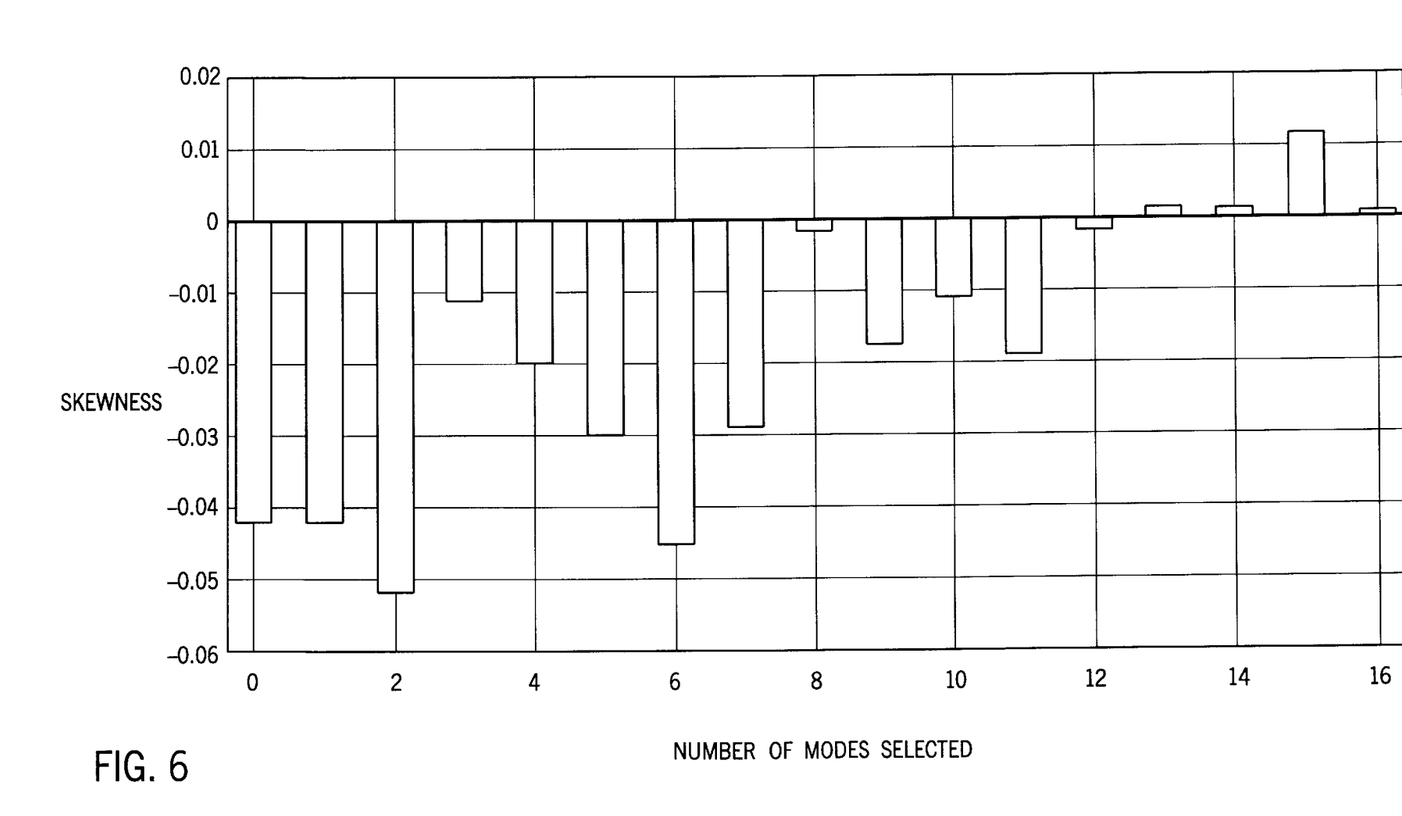
FIG. 6 illustrates skewness for each filtered residual signal.

A methodology in the form of the invention employing a SPRT form of pattern recognition approach was applied to a residual signal obtained from signals from two redundant subassembly outlet temperature sensors monitoring operation of the EBRII nuclear reactor at Argonne National Laboratory. FIGS. 4–6 are three bar graphs that summarize the statistical testing results used to determine the optimal number of Fourier modes to use to filter the raw residual signal.

FIG. 4 shows a test statistic used in the preferred SPRT methodology for determining when the residual signal is most Gaussian and white. The test statistic is plotted against the total number of Fourier modes selected for filtering the residual signal. The horizontal line represents the threshold value that the test statistic must be below to pass the test. The optimal number of modes to use is determined by the occurrence of the minimum value of the test statistic. For this example, the optimal number of Fourier modes to use for filtering is 12.

FIG. 5 shows the kurtosis for each residual signal after the number of modes shown on the abscissa have been used for filtering. In this case the kurtosis remains fairly constant regardless of the number of modes used for filtering the residual signal. The horizontal line represents the theoretical value of the kurtosis for Gaussian distributed data. FIG. 6 is the analogous graph for the skewness of each filtered residual signal. Similarly, the horizontal line represents the theoretical value of the skewness for Gaussian distributed data. When twelve modes are selected for filtering the raw residual signal the skewness is nearly zero, agreeing with the theoretical skewness value.

Figure 7A:
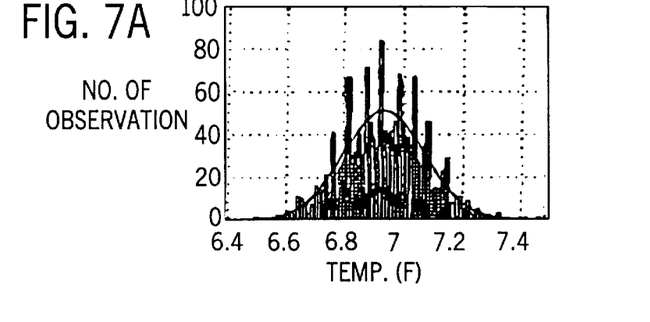
Figure 7B:
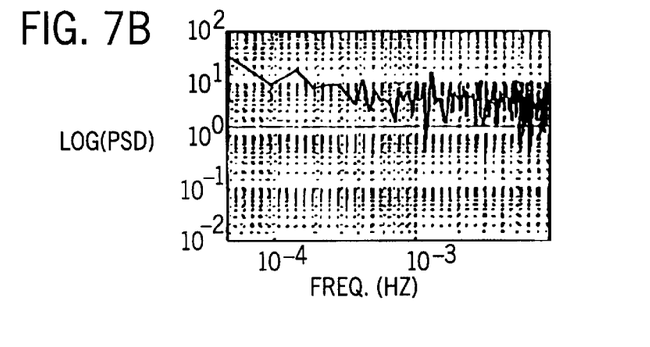
FIG. 7B illustrates the power spectral density of the raw residual signal.
Figure 7C:
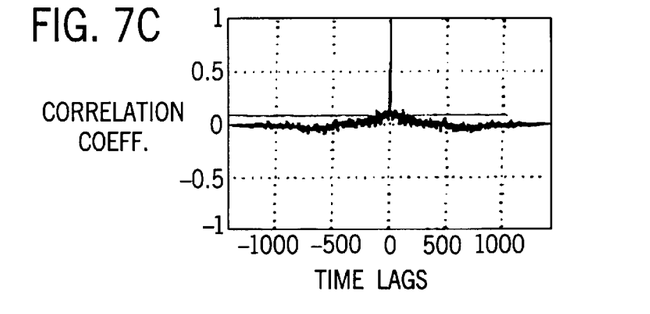
FIG. 7C illustrates the autocorrelation sequence of the raw residual signal.

FIGS. 7A–I show the improvement in Gaussianity and in whiteness after filtering using the twelve selected Fourier modes from the raw residual signal. The figures also demonstrate the signal reconstruction capability used in the method of FIG. 2 of the SPRT methodology. FIGS. 7A–7C show, respectively, the histogram, power spectral density (PSD) and autocorrelation sequence (AS) of the raw residual signal. The non-Gaussianity in the raw residual signal of FIG. 7A is apparent in the histogram, i.e., there are several spikes indicating that the probability of the signal having a value in the range where spiking occurs is not anywhere near what it would be if the signal were Gaussian. The PSD of FIG. 7B shows that the raw residual signal has large harmonic contributions at several frequencies, which means that the signal is not white. The AS of FIG. 7C also shows the non-whiteness of the signal. If the signal were white, the AS would have values of zero everywhere except at the zero lag (the center of the plot).

Figure 7D:
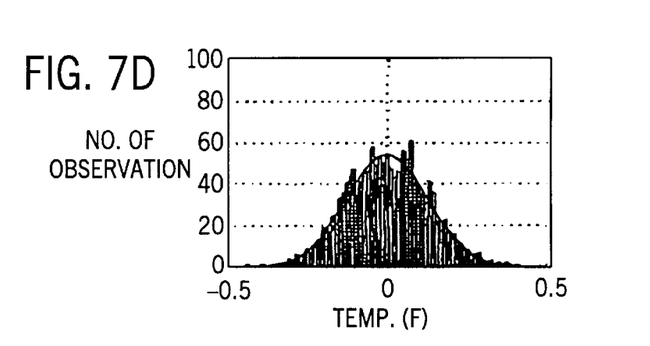
FIG. 7D shows the histogram corresponding to FIG. 7A after filtering using the twelve Fourier modes.
Figure 7E:
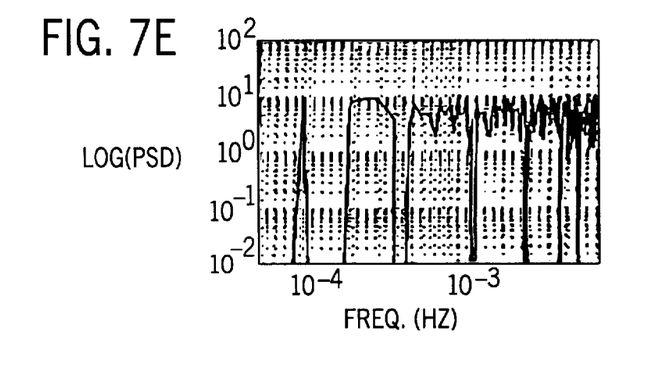
FIG. 7E illustrates the power spectral density corresponding to FIG. 7B after filtering using the Fourier modes.
Figure 7F:
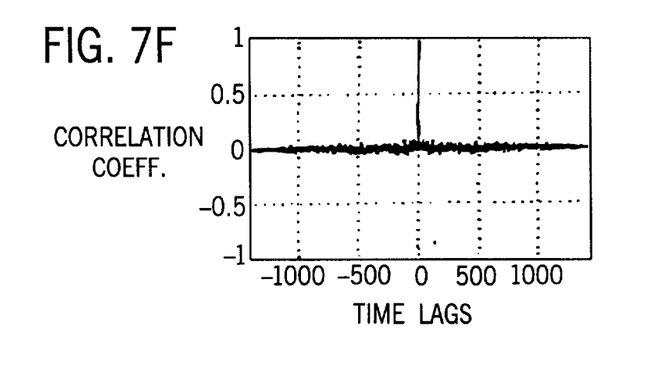
FIG. 7F illustrates the autocorrelation sequence corresponding to FIG. 7C after filtering using the Fourier modes.

FIGS. 7D–F show the effectiveness of the Fourier mode filtering process of the preferred SPRT methodology. The histogram of FIG. 7D fits the Gaussian distribution more accurately than before filtering, the PSD of FIG. 7E does not contain the larger frequency components, and the AS of FIG. 7F is flat and approximately zero everywhere except at the zero lag.

Figure 7G:
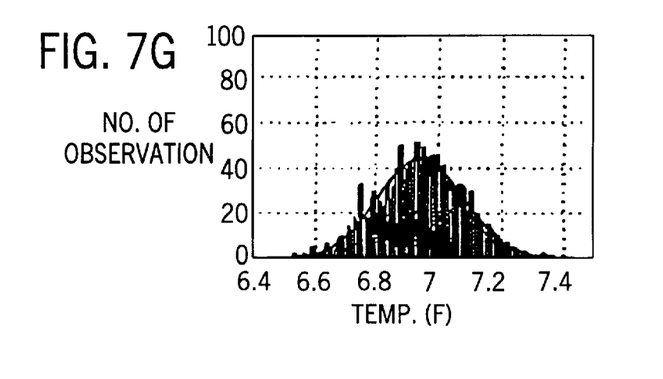
FIG. 7G shows a histogram for a simulated signal.
Figure 7H:
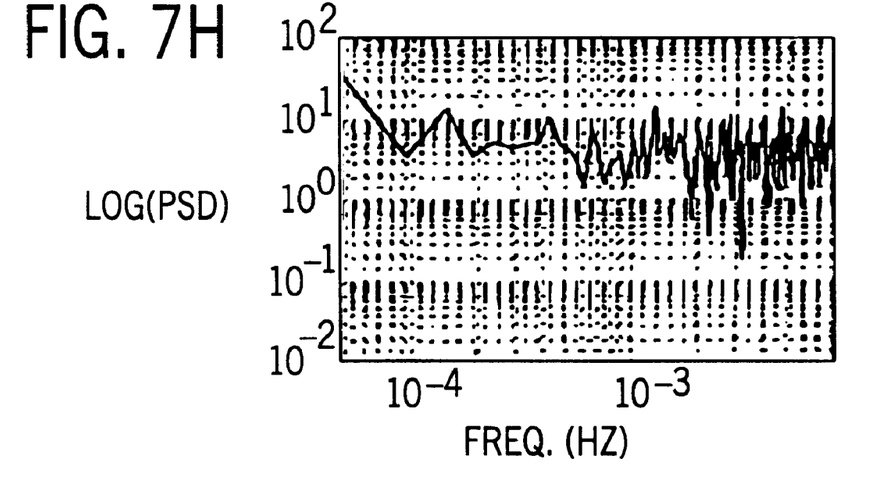
FIG. 7H shows the power spectral density for the simulated signal and FIG. 7I illustrates the autocorrelation sequence for the simulated signal.
Figure 7I:
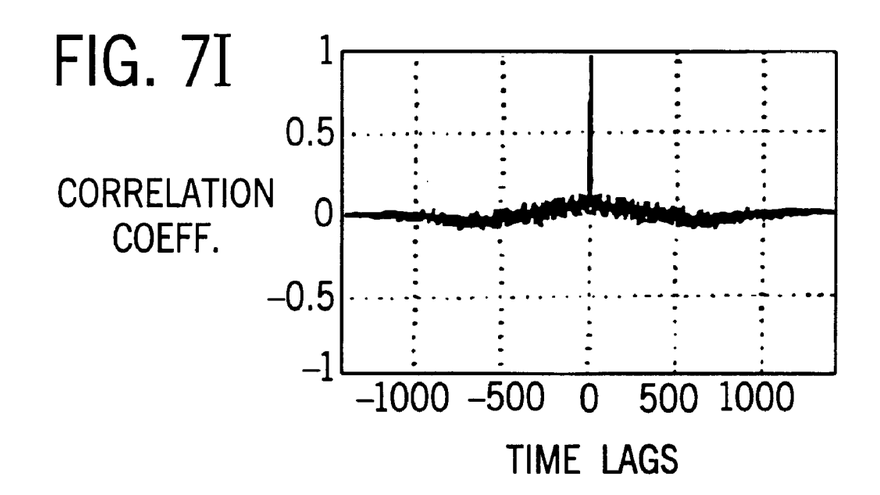

FIGS. 7G–I show, respectively, the histogram, PSD and AS for the simulated residual signal. The Fourier modes used for filtering the raw signal are used to represent the deterministic portion of the residual signal. Then, noise is added to the deterministic representation of the residual signal to produce the synthesized signal. This signal can then be used to carry out the steps of FIG. 2 for the preferred SPRT methodology.

Figure 8:
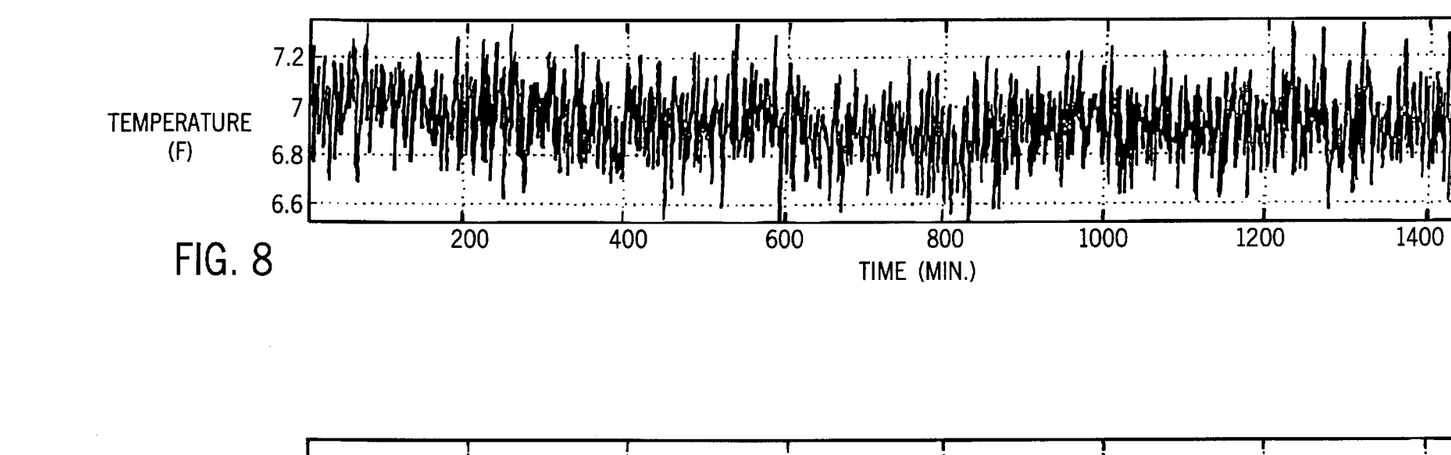
FIG. 8 illustrates the raw input signal before any processing.
Figure 9:
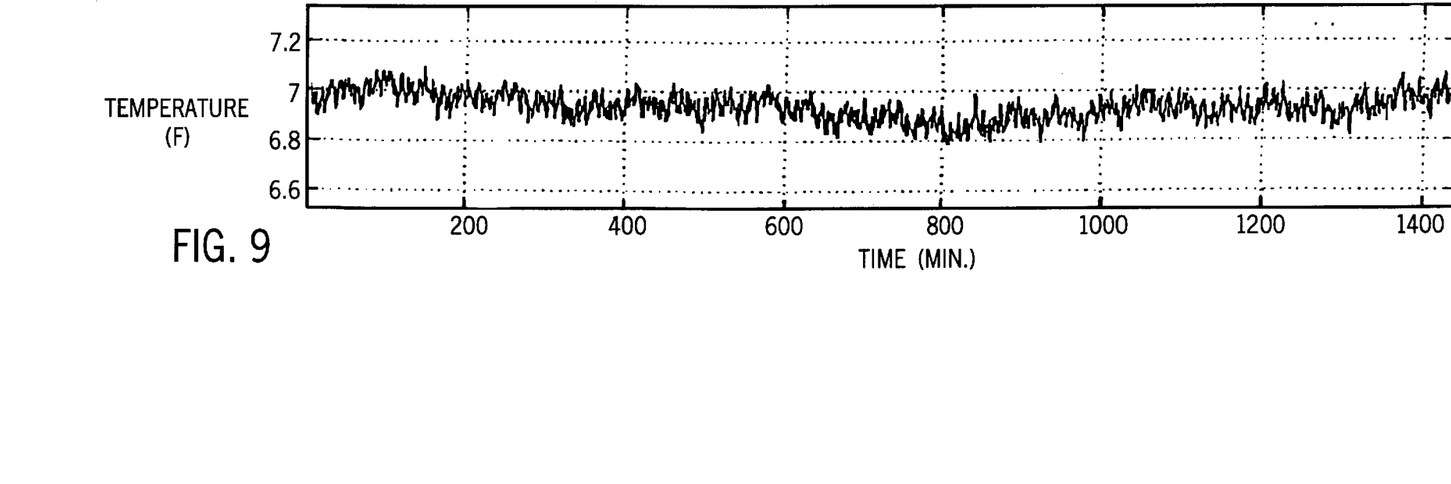
FIG. 9 illustrates reconstruction of the Fourier composite using the modes identified in the process of FIG. 1.
Figure 10:
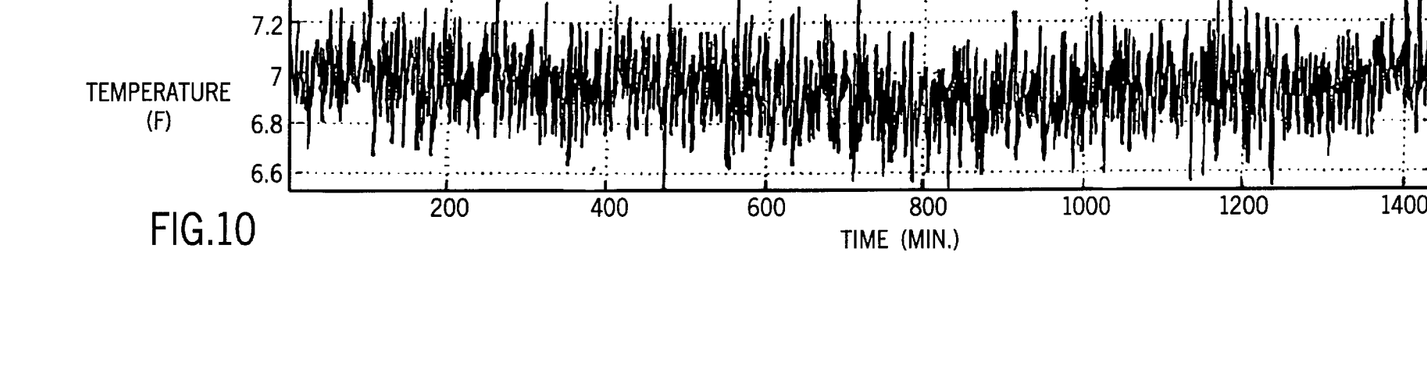
FIG. 10 illustrates reconstruction of the raw input signal employed in the process steps of FIG. 2.

FIGS. 8–10 demonstrate the reconstruction (or synthesis) of the raw residual signal used in the steps of FIG. 2. FIG. 8 is the raw signal, FIG. 9 is the Fourier composite using the modes identified in the steps of FIG. 1, and FIG. 10 is an example of the synthesized signal that is used in the Monte Carlo simulation in FIG. 2. In this example the reconstructed (or synthesized) signal is the same length as the raw residual signal for convenience, however, the reconstructed signal can now be generated to have any arbitrary length.

Figure 11:
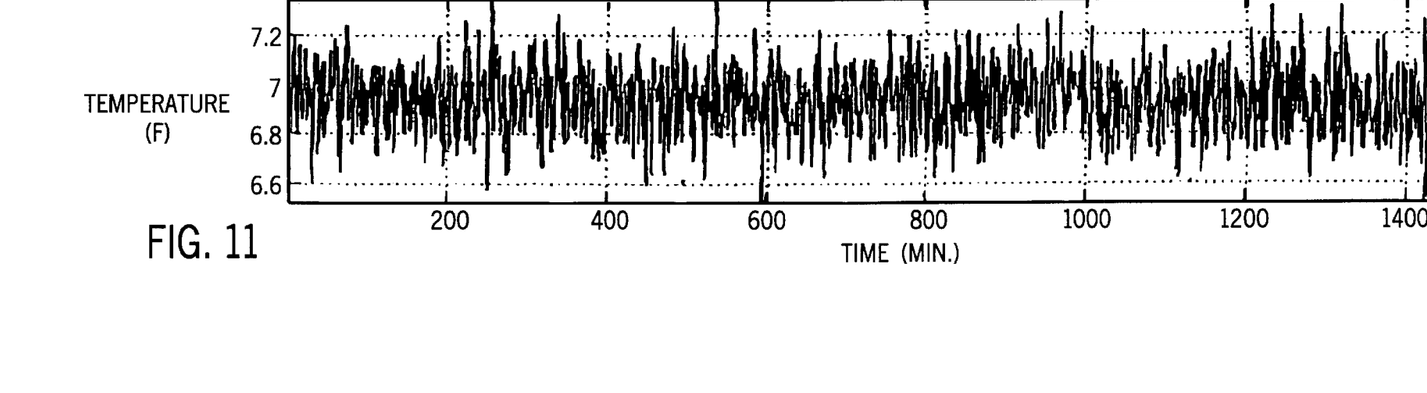
FIG. 11 illustrates a filtered raw input signal instead of the synthesized signal of FIG. 10.

FIG. 11 shows the filtered raw residual signal instead of the synthesized signal of FIG. 10. The filtered signal is used as input to the SPRT in the steps of FIG. 3 of the preferred SPRT methodology. When the steps of FIGS. 1 and 2 are completed, the residual signal is then processed in real time using the Fourier mode filtering method along with the SPRT methodology.

Figure 12:
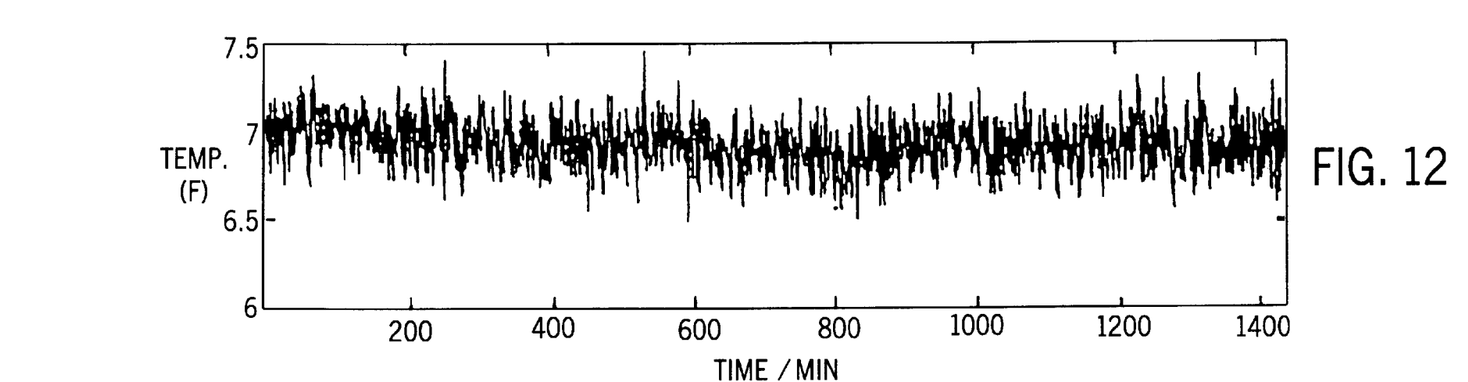
FIG. 12 illustrates the raw signal of FIG. 8 on an expanded temperature ordinate scale.
Figure 13:
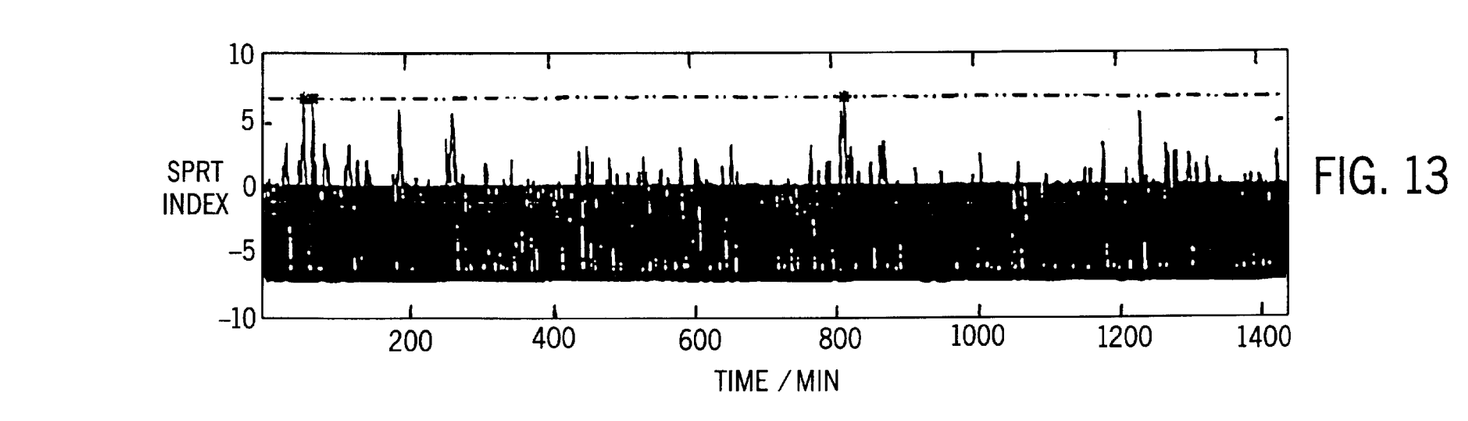
FIG. 13 illustrates a raw signal after being processed by the SPRT methodology of the invention with the target and achieved False Alarm probability.
Figure 14:
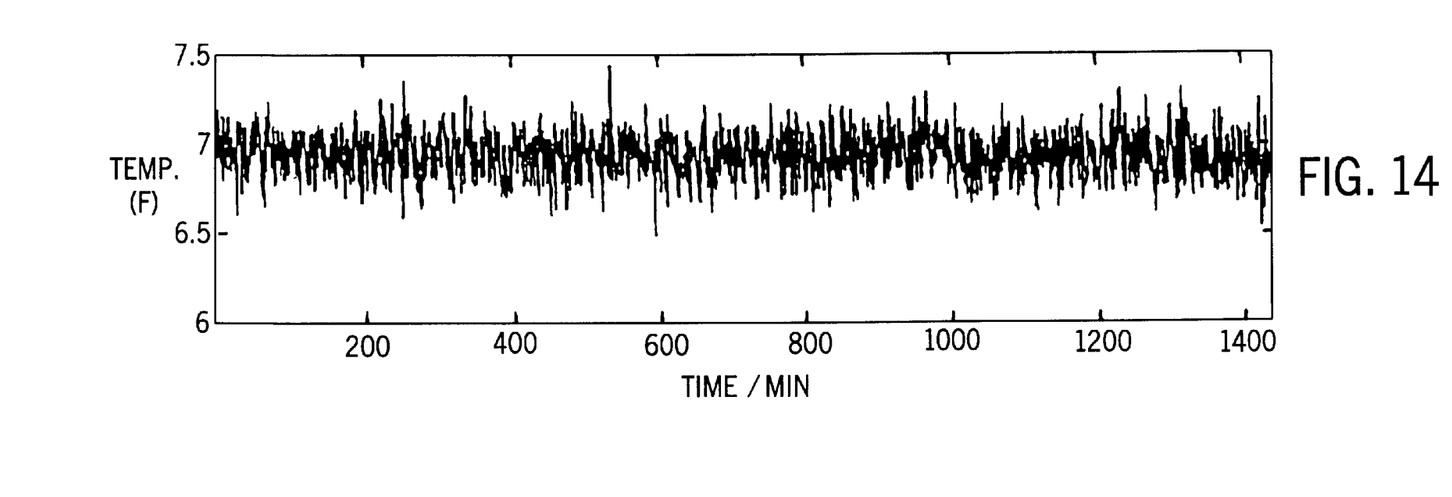
FIG. 14 illustrates the raw residual signal after filtering.
Figure 15:
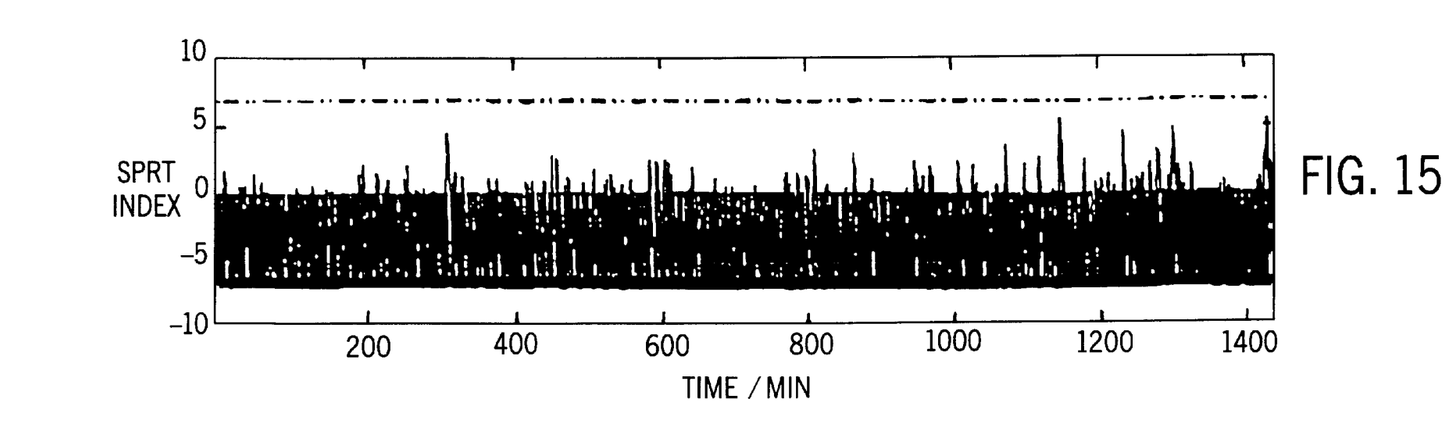
FIG. 15 illustrates the result of applying the SPRT methodology of the invention to the filtered raw signal of FIG. 14.

FIGS. 12–15 show the improvement achieved when using the SPRT after applying the preferred SPRT methodology to the raw residual signal. FIG. 12 is the raw residual signal, followed by the SPRT results in FIG. 13 when applied to the raw signal. The target Probability of False Alarm (PFA) or α is 0.0010. When the SPRT is applied directly to the raw residual signal the actual PFA is only 0.0057. The actual PFA is approximately 6 times greater than the target PFA. FIG. 14 shows the raw residual signal after filtering, followed by the SPRT results in FIG. 15 when applied to the filtered signal. The target PFA is still 0.001, which has now been achieved. In fact for these 1440 data points there are no false alarms.

While the principles of this invention have been described in connection with specific embodiments, it should be understood clearly that these descriptions are added only by way of example and are not intended to limit, in any way, the scope of the invention. Other advantages and features will become apparent from the claims hereinafter, with the scope of the claims determined by the reasonable equivalents, as understood by those skilled in the art.

What is claimed is:

1. A method of automatically establishing operational parameters of a surveillance system and monitoring a process, comprising the steps of:

(a) using an automated system for acquiring time dependent data characteristic of a state of interest;

(b) using an automated system for performing domain transformation on said time dependent data;

(c) using an automated system for constructing a Fourier composite using identified Fourier modes, by iteratively finding the optimal number of modes that are furthest away from the median PSD;

(d) using an automated system for filtering serial correlation from time dependent data;

(e) using an automated system for performing at least one Gaussian test, at least one whiteness noise test and an autocorrelation test and repeating steps (c) and (d) until these tests are satisfied;

(f) using an automated system for storing Fourier coefficients;

(g) using an automated system for generating a Fourier composite from said Fourier coefficients;

(h) using an automated system for adding pseudorandom noise to said Fourier composite;

(i) using an automated system for generating observations of a synthesized signal for Monte Carlo simulation;

(j) using an automated system for establishing SPRT missed alarm probabilities;

(k) using an automated system for testing said SPRT probabilities with a synthesized signal;

(l) using an automated system for evaluating empirically a false alarm rate and if less than desired target values, outputting said SPRT probabilities for use in performing surveillance by said system;

(m) if said false alarm rate is greater than said target values, reducing said SPRT probabilities and repeating steps (j) and (k) until obtaining said false alarm rate less than said desired target value; and (n) upon establishing operational parameters in said steps (a)–(m) for the surveillance system, carrying out an automated sequential probability ratio test to monitor a process for alarm conditions.

2. The method as defined in claim 1 further including the step of using an automated system for forming a Fourier composite without pseudorandom noise to produce a real time residual function.

3. The method as defined in claim 2 wherein a SPRT methodology operates on said filtered data without serial correlation.

4. The method as defined in claim 3 wherein said SPRT methodology outputs one of normal SPRT output, degraded SPRT output and a no decision SPRT output.

5. The method as defined in claim 4 wherein the no decision SPRT output is transmitted for additional sampling.

6. The method as defined in claim 4 further including operating on one of said outputs using a real time surveillance expert system.

7. The method as defined in claim 6 wherein said real time surveillance expert system compares output from parallel deployed SPRT modules.

8. A system for automatically establishing operational parameters of a surveillance system and monitoring a process using the operational parameters, comprising:

(a) an automated system for acquiring time dependent data characteristic of a state of interest for the process;

(b) an automated system for performing domain transformation on said time dependent data;

(c) an automated system for constructing a Fourier composite using identified Fourier modes, by iteratively finding the optimal number of modes that are furthest away from the median PSD;

(d) an automated system for filtering serial correlation from time dependent data;

(e) an automated system for performing at least one Gaussian test, at least one whiteness noise test and an autocorrelation test and repeating steps (c) and (d) until these tests are satisfied;

(f) an automated system for storing Fourier coefficients;

(g) an automated system for generating a Fourier composite from said Fourier coefficients;

(h) an automated system for adding pseudorandom noise to said Fourier composite;

(i) an automated system for generating observations of synthesized signal for Monte Carlo simulation;

(j) an automated system for establishing SPRT missed alarm probabilities;

(k) an automated system for testing said SPRT probabilities with a synthesized signal;

(l) an automated system for evaluating empirically a false alarm rate and if less than desired target values, outputting said SPRT probabilities for use in performing surveillance by said system and if said false alarm rate is greater than said target values, reducing said SPRT probabilities and using the automated system of (j) and (k) until obtaining said false alarm rate less than said desired target value; and (m) an automated system for carrying out a SPRT procedure using the operational parameters for the surveillance system to monitor a process for alarm conditions.

* * * * *

UNITED STATES PATENT AND TRADEMARK OFFICE
CERTIFICATE OF CORRECTION

PATENT NO. : 6,131,076
DATED : October 10, 2000
INVENTOR(S) : Wegerich, et al.

It is certified that error appears in the above-identified patent and that said Letters Patent is hereby corrected as shown below:

On the title page, item:

[75], inventor "Wegerich W Stephan" should be - - Stephan W. Wegerich - -.

In Col. 2, line 57, "nodes" should be - -modes - -.

Signed and Sealed this

Eighth Day of May, 2001

Attest:

NICHOLAS P. GODICI

Attesting Officer

Acting Director of the United States Patent and Trademark Office